United States Patent
Haerzschel et al.

[11] Patent Number: 6,166,113
[45] Date of Patent: Dec. 26, 2000

[54] FLEXIBLE BUILDING MATERIAL COMPOUNDS

[75] Inventors: Reinhard Haerzschel, Burghausen, Germany; Christoph Hahner, Ann Arbor, Mich.

[73] Assignee: Wacker-Chemie GmbH, Munich, Germany

[21] Appl. No.: 09/194,171

[22] PCT Filed: May 22, 1997

[86] PCT No.: PCT/EP97/02608

§ 371 Date: Nov. 20, 1998

§ 102(e) Date: Nov. 20, 1998

[87] PCT Pub. No.: WO97/44289

PCT Pub. Date: Nov. 27, 1997

[30] Foreign Application Priority Data

May 23, 1996 [DE] Germany .......................... 196 20 817

[51] Int. Cl.⁷ .................................................. C04B 24/26
[52] U.S. Cl. .................................................. 524/5; 524/4
[58] Field of Search .................................................. 524/5

[56] References Cited

U.S. PATENT DOCUMENTS

| | | | |
|---|---|---|---|
| 4,434,257 | 2/1984 | Narisawa et al. | 524/5 |
| 5,118,751 | 6/1992 | Schulze et al. | 524/5 |
| 5,348,993 | 9/1994 | Daeumer et al. | 524/44 |
| 5,567,750 | 10/1996 | Schulze et al. | 524/3 |
| 5,763,508 | 6/1998 | Hess et al. | 524/5 |

FOREIGN PATENT DOCUMENTS

| | | |
|---|---|---|
| 0295727 | 12/1988 | European Pat. Off. . |
| 0518406 | 12/1992 | European Pat. Off. . |
| 0527322 | 2/1993 | European Pat. Off. . |
| 0558980 | 9/1993 | European Pat. Off. . |
| 4206429 | 9/1993 | Germany . |
| 4321070 | 1/1995 | Germany . |
| 98420 | 9/1974 | Japan ........................................ 524/5 |
| 9257 | 1/1981 | Japan ........................................ 524/5 |
| 55441 | 5/1981 | Japan ........................................ 524/5 |
| 9207804 | 5/1992 | WIPO . |

OTHER PUBLICATIONS

Volkwein, A.; Petri, R.; Springenschmid, R.; "Protecting Concrete By Flexible Waterproofing Slurries", Betonwerk–Pertigteil–Tech (1988) 54(8) 30–36; 54(9) 72–78.

Hawley's Condensed Chemical Dictionary, Van Nostrand Reinhold Co. N.Y. Twelfth Edition, p. 461, 1993.

*Primary Examiner*—Peter A. Szekely
*Attorney, Agent, or Firm*—Burgess, Ryan & Wayne; Milton J. Wayne; William R. Moran

[57] ABSTRACT

Flexible building compositions are provided which are based on mineral binders and vinylester-ethylene mixed polymers which are stabilized by protective colloids and prepared by radical aqueous emulsion polymerization.

14 Claims, No Drawings

FLEXIBLE BUILDING MATERIAL COMPOUNDS

BACKGROUND OF THE INVENTION

1. Field of the Invention

The invention relates to flexible, polymer-modified building compositions and also the use of vinyl ester ethylene copolymers stabilized by protective colloids for flexibilizing building compositions.

2. Background Art

For certain applications in the building sector, for example in sealing slurries or for building adhesives, highly flexible concrete or mortar mixtures are required. In accordance with standards, for example in sealing slurries, use is made of mortar mixtures which are modified with emulsifier-stabilized acrylate dispersions. WO-A 92/07804 (AU-A 9186679) describes binders for flexibilizing building materials, which binders comprise mixtures of polyester resin and styrene-acrylate copolymer—emulsion. EP-A 558980 (U.S. Pat. No. 5,348,993) discloses emulsifier-stabilized styrene-acrylate and vinyl ester-acrylate dispersions as additives for building materials. In the case of these additives, the flexibility is achieved by means of the, polymer component and the use of emulsifiers for stabilizing the emulsion. An overview of the present state of the art for flexibilizing building compositions is given in Volkwein, A; Petri, R.; Springenschmid, R; "Protecting concrete by flexible waterproofing slurries", Betonwerk-Fertigteil-Tech. (1988), 54(8) 30–36, 54(9) 72–78.

A disadvantage of the previously used emulsifier-stabilized styrene-acrylate dispersions is that they can only be used in 2-component systems (component 1=dry mortar, component 2=dispersion), while sufficient flexibilization is not achieved when using redispersible dispersion powders (in 1-component systems) containing the present-day systems (vinyl acetate-ethylene copolymers). However, the great advantage of dispersion powders as compared with the dispersions is that it is possible to produce dry mortar mixtures which only have to be mixed with water on the building site. This brings many advantages such as increased formulation reliability, safe handling and simple disposal of containers. Up to now, there have been no systems based on emulsifier-stabilized vinyl ester copolymer dispersions available which have been able to compete with styrene-acrylate copolymer dispersions in terms of flexibility.

DE-A 4206429 (U.S. Pat. No. 5,348,993) discloses binders for improving the flexibility of building materials based on vinyl propionate-VeoVa9®(VeoVa10®)[1] emulsion polymers which are prepared in the presence of an emulsifier combination comprising ethylene oxide-propylene oxide polyethers, ethoxylated alkylphenol and ethoxylated polysaccharide. A disadvantage is that sufficient extensibility is not achieved, for example when used in sealing slurries.

EP-A 527322 discloses additives for cement mixtures which comprise ethylene-vinyl acetate-vinyl pivalate copolymers prepared by the emulsion polymerization method in the presence of emulsifier and protective colloid. The improved alkali resistance compared with vinyl acetate-ethylene copolymers is emphasized. A disadvantage is the extensibility which is insufficient for flexibilizing building materials.

EP-A 518406 discloses the preparation of copolymers of ethylene, vinyl acetate and of vinyl esters of α-branched, tertiary carboxylic acids having 5 or 9 carbon atoms, with vinyl pivalate (VeoVa5®) being copolymerized in place of VeoVa9® to improve the degree of incorporation of ethylene. EP-A 295727 relates to ethylene-vinyl acetate copolymers with vinyl esters of α-branched tertiary carboxylic acids having 9 carbon atoms (VeoVa9®) or 10 carbon atoms (VeoVa10®), with copolymers containing VeoVa9® being recommended in place of VeoVa10® for paints having reduced tack. The flexibilization of building compositions is discussed neither in EP-A 518406 nor in EP-A 295727.

It is an object of the invention to provide copolymers based on vinyl ester copolymers which are

[1] VeoVa5®; VeoVa9®; VeoVa10®; VeoVa11® vinyl ester are registered trademarks of Shell Corporations covering α-branched carboxylic acids.

suitable both in the form of aqueous dispersions and preferably in the form of redispersible dispersion powders which can be produced from these dispersions for producing highly flexible building compositions, specifically sealing slurries. These copolymers should meet the requirements that the corresponding copolymer dispersions have a strength and flexibility at least equal to the customary styrene-acrylate dispersions but the corresponding dispersion powders effect a significantly better flexibilization than do conventional vinyl acetate-ethylene dispersion powders.

SUMMARY OF THE INVENTION it has surprisingly been found that addition of protective colloid-stabilized copolymers of vinyl acetate, ethylene and vinyl esters of unbranched or branched carboxylic acids having from 5 to 18 carbon atoms which have been prepared by the emulsion polymerization process with stabilization using protective colloid provides highly flexible building compositions which have good strength and a significantly higher extensibility than building compositions modified with powders based on vinyl acetate-ethylene.

The invention provides flexible, polymer-modified building compositions based on mineral binders and one or more vinyl ester-ethylene copolymers, characterized in that the building compositions contain protective colloid-stabilized vinyl ester-ethylene copolymers obtainable by free-radical, aqueous emulsion polymerization of a) 15–80% by weight of vinyl acetate, b) 5–35% by weight of ethylene, c) 5–60% by weight of one or more vinyl esters of unbranched or branched carboxylic acids having from 5 to 18 carbon atoms, and d) 0–10% by weight of further copolymerizable ethylenically unsaturated monomers.

The invention further provides for the use of protective colloid-stabilized vinyl ester-ethylene copolymers obtainable by free-radical, aqueous emulsion polymerization of a) 15–80% by weight of vinyl acetate, b) 5–35% by weight of ethylene, c) 5–60% by weight of one or more vinyl esters of unbranched or branched carboxylic acids having from 5 to 18 carbon atoms, and d) 0–10% by weight of further copolymerizable ethylenically unsaturated monomers, for producing flexible building compositions based on mineral binders.

The percentages by weight are in each case based on the total weight of the copolymer.

DESCRIPTION OF THE PREFERRED EMBODIMENTS

Preferred comonomers c) are vinyl laurate, vinyl stearate, vinyl 2-ethylhexanoate and vinyl esters of α-branched, tertiary carboxylic acids having from 5 to 11 carbon atoms, for example VeoVa5®, VeoVa9®, VeoVa10®, and VeoVa11® (vinyl esters of versatic acid from Shell having 5, 9, 10 and 11 carbon atoms). Particular preference is given to the vinyl esters of α-branched, tertiary carboxylic acids having from 9 to 11 carbon atoms, for example VeoVa9®, VeoVa10®, or VeoVa11®.

Suitable comonomers d) are, for example, auxiliary monomers for stabilization such as α,β-monoethylenically unsaturated monocarboxylic and dicarboxylic acids and their amides or nitrites, for example acrylic acid, methacrylic acid, acrylamide; ethylenically unsaturated sulphonic acids or their salts, preferably vinylsulphonic acid, 2-acrylamido propanesulphonate; N-vinylpyrrolidone.

Particular preference is given to vinyl ester-ethylene copolymers comprising a) 40–70% by weight of vinyl acetate,
b) 10–30% by weight of ethylene and
c) 20–40% by weight of one or more vinyl esters of α-branched, tertiary carboxylic acids having 5, 9, 10 or 11 carbon atoms.

The said protective colloid-stabilized vinyl ester-ethylene copolymers are prepared by the free-radical, aqueous emulsion polymerization process, with stabilization using protective colloid. The polymerization medium used is preferably water; mixtures of water and water-miscible liquids can also be used. The polymerization can be carried out batchwise or continuously, with or without use of seed lattices, with initial charging of all or individual constituents of the reaction mixture, or with partial initial charging and subsequent metering in all or the other individual constituents of the reaction mixture, or by the feed stream process without an initial charge. All metered additions are preferably carried out so as to correspond to the consumption of the respective component(s).

The polymerization is generally carried out in a temperature range from 20 to 95° C., preferably from 25 to 65° C. The ethylene pressure is between 10 and 85 bar. Initiation is carried out using the water-soluble free-radical formers customarily used for emulsion polymerization, these being preferably used in amounts of from 0.01 to 5.0% by weight, based on the total weight of monomers. Examples of these are hydrogen peroxide, t-butyl peroxide; alkyl hydroperoxides such as t-butyl hydroperoxide; potassium, sodium and ammonium peroxodisulphate; azo compounds such as azobisisobutyronitrile or azobiscyanovaleric acid. The known free-radical initiators are preferably combined in a known manner with from 0.01 to 1.0% by weight, based on the total weight of the monomers, or reducing agents. Examples of suitable reducing agents are alkali metal formaldehyde sulphoxylate, hydroxymethanesulphinic acid, sodium sulphite and ascorbic acid. In the redox initiation, preference is given to metering in one or both redox catalyst components during the polymerization. In addition, the reactivity of the initiator system can be increased by addition of metal ions which can occur in a plurality of oxidation states. Preference is given to using iron(II) ions, for example in the form of iron(II) sulphate.

Dispersants used for stabilizing the polymerization mixture are preferably exclusively protective colloids, without addition of emulsifier; particularly preferably in amounts of from 1 up to 20% by weight, based on the total weight of the monomers. Suitable protective colloids are, for example, celluloses such as hydroxyethylcellulose, hydroxypropylcellulose and carboxymethylcellulose; polyvinyl alcohols, polyethylene glycol, polyvinylpyrrolidones, poly(meth)acrylic acid; preference is given to using partially saponified polyvinyl alcohols. Particular preference is given to partially saponified polyvinyl alcohols having a degree of hydrolysis of from 75 to 95 mol % and a Höppler viscosity (4% strength solution in water at 20° C.) of from 4 to 35 mPas. If emulsifiers are used, their amount should be less than 1.0% by weight, based on the total weight of the monomers.

After the polymerization is complete, the dispersion is adjusted to a solids content of from 30 to 65% by weight, preferably from 45 to 55% by weight. The protective colloid-stabilized vinyl ester-ethylene copolymers can be added to the building materials in the form of their aqueous dispersions or preferably in the form of dispersion powders redispersible in water.

The dispersion powders are preferably produced by means of spray drying. Here, drying is carried out in customary spray drying units, with atomization being able to be carried out by means of one-fluid, two-fluid or multifluid nozzles or by means of a rotary disc.

Before spray drying, the protective colloid-stabilized vinyl ester-ethylene copolymer dispersion obtained after the emulsion polymerization is preferably adjusted to a solids content of from 20 to 60% The solids content is dependent on the type and amount of further additives which are added in the drying procedure. For example, further amounts, preferably from 2 to 20% by weight based on the vinyl ester-ethylene copolymer, of the abovementioned protective colloid can be added to the dispersion as atomization aid.

In the atomization, a content of up to 1.5% by weight of antifoam, based on the copolymer, has often been found to be useful. Liquid antifoams are normally added to the dispersion before drying, solid antifoams can be mixed into the dry dispersion powder composition.

The mean particle size of the dispersion powder particles is generally from 10 to 400 μm. The powders redisperse in water to give a dispersion having particle sizes between 0.1 and 5.0 μm.

To increase the shelf life by improving the anticaking stability, the powder obtained can be admixed with an anticaking agent, preferably from 3 to 25% by weight based on the total weight of polymeric constituents. Examples of anticaking agents are finely milled aluminium silicates, kieselguhr, colloidal silica gel, pyrogenic silica, precipitated silica, microsilica, light spar, kaolin, talc, cements, diatomaceous earth, magnesium carbonate and/or calcium carbonate or magnesium hydrosilicate.

Further constituents of the dispersion powder composition present in preferred embodiments are, for example, dyes, fillers, foam stabilizers, waterproofing agents. These constituents can be added before or after spray drying.

The protective colloid-stabilized vinyl ester-ethylene copolymers are used in the form of their aqueous dispersions or preferably their dispersion powder compositions for modifying building compositions based on mineral binders, for example cement, plaster of Paris or lime mortar. Use as dispersion powders is preferred to use of the likewise usable aqueous dispersions since they make it possible to produce dry mortar mixtures which only have to be mixed with water at the building site.

Examples of mineral binders are cements such as Portland cement, aluminate cement, pozzolanic cement, coating cement, magnesia cement and phosphate cement, plaster such as calcium sulphate hemihydrate in the form of building plaster, stucco plaster or modelling plaster and/or lime such as calcium hydroxide. Apart from the mineral binders and water, the building compositions additionally contain aggregates such as sands, for example quartz sand or quartz flour, gravels, chalks, dolomite, light spar, in each case in the particle size and amount customary for the respective application. Further examples of aggregates are fibres such as acrylate, polyethylene or cellulose fibres.

Further additives customary for making up building compositions are thickeners, for example organic thickeners such as cellulose ethers and inorganic thickeners such as bentonite, pigments, wetting agents, dispersants, preservatives, antifoams, film-forming aids and frost protection agents.

The protective colloid-stabilized vinyl ester-ethylene copolymers are preferably used for producing highly flexible sealing slurries, building adhesives, jointing mortars, repair mortars or crack-bridging plasters and renders. Most preferred is the use for producing highly flexible, cement-containing sealing slurries. A typical dry formulation for sealing slurries is, for example;

from 10 to 50 parts by weight of cement,
from 10 to 50 parts by weight of quartz sand,
from 1.0 to 10 parts by weight of fibres,
from 0.1 to 1.0 part by weight of cement fluidizers and
from 0.1 to 1.0 part by weight of antifoam.

To flexibilize the building compositions, the protective colloid-stabilized vinyl ester-ethylene copolymers are preferably used in an amount of from 10 to 50% by weight, proportion of copolymer based on the total weight of the dry formulation. The ready-to-use building composition is produced by mixing with water, with the amount of water being such that from 25 to 60 parts by weight of water are used per 100 parts by weight of dry formulation.

When using aqueous dispersions of the protective colloid-stabilized vinyl ester-ethylene copolymers, the dispersion can be mixed into the mortar mixture using the mechanical mixers customary in the building industry. The procedure is advantageously to dilute the dispersion with the required amount of make-up water and to add it to the mixture of cement and aggregates and, if desired, further additives. For use in the form of a dispersion powder, the dispersion powder is mixed with the constituents of the dry formulation and this mixture is mixed with the calculated amount of make-up water.

The protective colloid-stabilized vinyl ester-ethylene copolymers to be used according to the invention provide for the first time agents based on vinyl acetate-ethylene copolymers for elastifying building compositions, which agents are in the form of their aqueous dispersions at least equal to the established styrene-acrylate dispersions but as dispersion powders are significantly superior in respect of extensibility to protective colloid-stabilized styrene-acrylate and vinyl acetate-ethylene powders. Vinyl acetate-ethylene polymers customary hitherto have shown only insufficient extensibility and flexibility for this application, a reason why only styrene-acrylate dispersions have hitherto been used in this application (see Volkwein, A et al.).

EXAMPLES

Dispersions and dispersion powders to be used according to the invention:

Dispersion 1:
An aqueous dispersion having a solids content of 51.5% by weight of a vinyl acetate-ethylene-VeoVa10 copolymer comprising 56% by weight of vinyl acetate, 20% by weight of ethylene, 24% by weight of VeoVa10® and having a $T_g$ of −13° C., which is stabilized with 3% by weight of polyvinyl alcohol having a degree of hydrolysis of 88% and a Höppler viscosity of 4 mPas (4% strength solution in water at 20° C.).

Dispersion 2:
An aqueous dispersion having a solids content of 48% by weight of a vinyl acetate-ethylene-VeoVa10 copolymer comprising 46% by weight of vinyl acetate, 23% by weight of ethylene, 31% by weight of VeoVa10® and having a $T_g$ of −15° C., which is stabilized with 3% by weight of polyvinyl alcohol having a degree of hydrolysis of 88% and a Höppler viscosity of 4 mPas (4%. strength solution in water at 20° C.).

Dispersion Powders 1 and 2:
To produce the dispersion powders, the abovementioned dispersions 1 and 2 were each admixed with 10% by weight, based on polymer, of a polyvinyl alcohol having a degree of hydrolysis of 88 mol % and a Höppler viscosity of 8 mPas and 0.3% by weight, based on polymer, of antifoam. The mixture was spray dried using a two-fluid nozzle. The powder obtained was admixed with 10% by weight of commercial anticaking agent.

Comparative dispersions and comparative dispersion powders not to be used according to the invention, Dispersion A:
Aqueous, emulsifier-stabilized dispersion having a solids content of about 55% by weight of a styrene-acrylate copolymer having a $T_g$ of −7° C.

Dispersion B:
Aqueous, emulsifier-stabilized dispersion having a solids content of about 50% by weight of a styrene-acrylate copolymer having a $T_g$ of −7° C.

Dispersion C:
Aqueous, emulsifier-stabilized dispersion having a solids content of about 53% by weight of a styrene-acrylate copolymer having a $T_g$ of −40° C.

Dispersion Powders A to D:
To produce the dispersion powders A–D, the corresponding aqueous dispersions were each admixed with 10% by weight, based on polymer, of a polyvinyl alcohol having a degree of hydrolysis of 88 mol % and a Höppler viscosity of 8 mPas and 0.3% by weight, based on polymer, of antifoam. The mixture was spray dried using a two-fluid nozzle and the powder obtained was admixed with 10% by weight of commercial anticaking agent.

Dispersion Powder A:
Dispersion powder based on a polyvinyl alcohol-stabilized styrene-acrylate copolymer having a $T_g$ of −7° C.

Dispersion Powder B:
Dispersion powder based on a polyvinyl alcohol-stabilized styrene-acrylate copolymer having a $T_g$ of −18° C.

Dispersion Powder C:
Dispersion powder based on a polyvinyl alcohol-stabilized styrene-acrylate copolymer having a $T_g$ of −40° C.

Dispersion Powder D:
Dispersion powder based on a polyvinyl alcohol-stabilized vinyl acetate-ethylene copolymer having a $T_g$ of −7° C.

Use Testing:
The dispersion powders were tested in sealing slurry compositions having the following formulations I and III. The dispersions were tested in sealing slurry compositions having the formulation II.

| Formulation | I (parts by weight) | II (parts by weight) | III (parts by weight) |
|---|---|---|---|
| Portland cement PZ 35 | 350 | 350 | 350 |
| Quartz sand F 36 | 285 | 285 | 185 |
| Arbocell BC 1000 (fibres) | 20 | 20 | 20 |
| Melment F 10 (cement fluidizer) | 3 | 3 | 3 |
| Tixoton CV 15 (thickener) | 5 | 5 | 5 |
| Agitan P 800 (antifoam) | 37 | 37 | 37 |
| Dispersion powder | 300 | — | 400 |
| Dispersion (50% solids content) | — | 600 | — |
| Water | 350 | 50 | 350 |

The constituents of the formulation were mixed dry for 3 minutes in a mortar mixer. The water was then added, in the case of the formulation II both the dispersion and the water, and mixing was continued for a further 2 minutes. After a maturing time of 10 minutes, the mortar was mixed for 30 seconds and then spread by means of a trowel in a Teflon template to give a 2 mm thick sealing coat, after drying it was removed from the template and then stored as described in Tables 1, 2 and 3.

After storage, tensile bars were stamped from the sealing coats and the tensile strength and elongation at break of these were determined in a tensile test in accordance with DIN 53504 on an Instron tensile tester at an extension rate of 10 mm/min. The mean values of the individual series of measurements are given in Tables 1 to 3.

In the tables:

d=storage time in days;=storage time in minutes;

SC=storage under standard conditions at 23° C., 50% relative atmospheric humidity;

wet=wet storage at 23° C. in water;

0° C.=storage at 0° C., 50% relative atmospheric humidity.

The measured values are given in the table as follows: elongation at break [%]/tensile strength [N/mm$^2$].

TABLE 1

(Power according to formulation I):

| Storage | A | B | C | D | 1 | 2 |
|---|---|---|---|---|---|---|
| 28d SC | 5.6/2.2 | 5.1/2.8 | 4.5/— | 13.3/4.3 | 30.7/3.4 | 32.4/2.1 |
| 28d SC 7d wet | 5.5/2.1 | 5.9/1.1 | 7.2/0.8 | 12.9/4.9 | 12.4/1.2 | 14.6/0.9 |
| 28d SC 14d wet 14d SC | 1.5/4.4 | 3.5/3.7 | 2.1/3.9 | 9.8/0.9 | 23.0/3.8 | 18.5/3.5 |
| 28d SC 30' 0° C. | —/— | 5.4/10.5 | 2.1/11.0 | —/— | 6.3/10.4 | 14.9/6.8 |

The sealing slurries modified with the powders 1 and 2 (polyvinyl alcohol-stabilized vinyl acetate-ethylene-VeoVa10® polymers) display significantly better elongation at break, while retaining the tensile strength, than polyvinyl alcohol-stabilized styrene-acrylate powders (powders A, B, C) or polyvinyl alcohol-stabilized vinyl acetate-ethylene powders (powder D).

TABLE 2

(Power according to formulation III):

| Storage | A | B | C | D | 1 | 2 |
|---|---|---|---|---|---|---|
| 28d SC | 9.9/2.0 | 10.2/2.7 | 8.7/— | 19.4/3.9 | 57.2/3.4 | 67.1/1.9 |
| 28d SC 7d wet | 9.0/1.9 | 9.8/0.9 | 11.2/0.7 | 21.3/0.6 | 48.3/1.0 | 47.2/0.8 |
| 28d SC 14d wet 14d SC | 2.6/4.4 | 5.9/3.9 | 3.3/4.1 | 14.4/3.8 | 63.7/3.5 | 62.6/3.3 |
| 28d SC 30' 0° C. | —/— | 10.8/10.7 | 4.1/11.7 | —/— | 18.1/10.7 | 29.6/7.6 |

A similar result to Table 1 was obtained:

The sealing slurries modified with the powders 1 and 2 (polyvinyl alcohol-stabilized vinyl acetate-ethylene-VeoVa10® polymers) display significantly better elongation at break, while retaining the tensile strength, than polyvinyl alcohol-stabilized styrene-acrylate copolymers (powders A, B, C) or polyvinyl alcohol-stabilized vinyl acetate-ethylene powders (powder D).

TABLE 3

(Dispersion according to formulation II):

| Storage | A | B | C | 1 | 2 |
|---|---|---|---|---|---|
| 14d SC | 62.2/2.5 | 35.1/3.9 | 37.5/2.0 | 115.0/2.5 | 113.0/1.6 |
| 14d SC 7d wet | 39.4/0.7 | 39.3/0.7 | 36.7/5.7 | 34.1/— | 44.3/0.6 |

TABLE 3-continued (Dispersion according to formulation II):

| Storage | A | B | C | 1 | 2 |
|---|---|---|---|---|---|
| 14d SC 7d wet 7d SC | 59.4/2.5 | 27.2/5.1 | 27.4/2.1 | 58.1/2.8 | 80.8/1.8 |

The use according to the invention of the protective colloid-stabilized vinyl ester-ethylene copolymers in the form of their aqueous dispersions (dispersion 1 and 2) effects an elastification of the building compositions which in respect of the extensibility is at least equal (dispersion a) or significantly superior (dispersions b, c) to the conventional emulsifier-stabilized styrene-acrylate dispersions.

What is claimed is:

1. Flexible, polymer-modified building compositions based on mineral binders wherein the building compositions contain protective colloid-stabilized vinyl ester-ethylene copolymers consisting essentially of copolymers obtainable by free-radical, aqueous emulsion polymerization of
   a) 15–80% by weight of vinyl acetate,
   b) 5–35% by weight of ethylene,
   c) 5–60% by weight of one or more vinyl esters of α-branched carboxylic acids having 9–11 carbon atoms, and
   d) 0–10% by weight of further copolymerizable ethylenically unsaturated monomers, with the proviso that no emulsifier is contained in the building composition.

2. A process for the preparation of a flexible, polymer modified building composition based on mineral binders which comprises adding to a mineral binder composition, a protective colloid stabilized vinylester ethylene copolymer, which contains no emulsifier, and consists essentially of a copolymer being in the form of an aqueous dispersion or re-dispersible powder and obtained by free-radical, aqueous emulsion polymerization of
   a) 15–80% by weight of vinyl acetate,
   b) 5–35% by weight of ethylene,
   c) 5–60% by weight of one or more vinyl esters of α-branched carboxylic acids having 9–11 carbon atoms, and
   d) 0–10% by weight of further copolymerizable ethylenically unsaturated monomers.

3. Claim 1, wherein the comonomers c) are selected from the group consisting of vinyl laurate, vinyl stearate, vinyl 2-ethylhexanoate and vinyl esters of a branched, tertiary carboxylic acid having from 5 to 11 carbon atoms.

4. Claim 1, wherein the vinyl ester-ethylene copolymers used comprise
   a) 40–70% by weight of vinyl acetate,
   b) 10–30% by weight of ethylene and
   c) 20–40% by weight of one or more vinyl esters of α-branched, tertiary carboxylic acids having 9, 10 or 11 carbon atoms.

5. Claim 1, wherein the protective colloids present are partially saponified polyvinyl alcohols having a degree of hydrolysis of from 75 to 95 mol % and a Höppler viscosity (4% strength solution in water at 20° C.) of from 4 to 35 mPas.

6. Claim 1, wherein the protective colloid-stabilized vinyl ester-ethylene copolymers are added in the form of their aqueous dispersions to the building materials.

7. Claim 1, wherein the protective colloid-stabilized vinyl ester-ethylene copolymers are added in the form of dispersion powders redispersible in water to the building materials.

8. Claim 1, wherein the building compositions belong to the group consisting of sealing slurries, building adhesives, jointing mortars, repair mortars, crack-bridging plasters and renders.

9. Claim 1, wherein the protective colloid-stabilized vinyl ester-ethylene copolymers are present in an amount of from 10 to 50% by weight, proportion of copolymer based on the total weight of the dry formulation.

10. The process of claim 2 wherein the copolymer is in the form of a redispersible powder.

11. The process of claim 2 wherein the copolymer is obtained by free-radical aqueous emulsion polymerization of
   a) 40–70% by weight of vinyl acetate,
   b) 10–30% by weight of ethylene and
   c) 20–40% by weight of at least one vinyl ester of a branched, tertiary carboxylic acid having 9, 10 or 11 carbon atoms.

12. The process of claim 2 wherein the protective colloids are partially saponified polyvinyl alcohols having a degree of hydrolysis of from 75 to 95 mol % and a Höppler viscosity (4% strength solution in water at 20 C) of from 4 to 35 mPas.

13. The process of claim 2 wherein the flexible, polymer-modified building compositions are in the form of sealing slurries.

14. The process of claim 2 wherein the mineral binder composition is comprised of:
   from 10 to 50 parts by weight of cement,
   from 10 to 50 parts by weight of quartz sand,
   from 1.0 to 10 parts by weight of fibres,
   from 0.1 to 1.0 parts by weight of cement fluidizers and
   from 0.1 to 1.0 parts by weight of antifoam.

* * * * *